Nov. 13, 1951 W. B. MOULTON 2,574,702
FISH LURE
Filed March 16, 1949
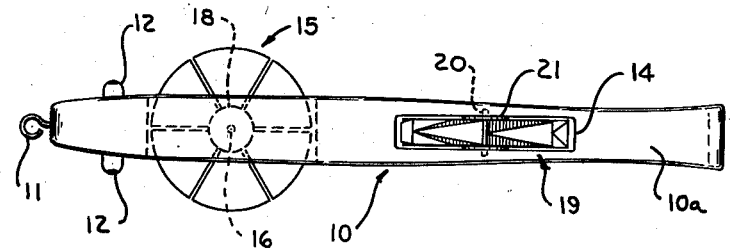
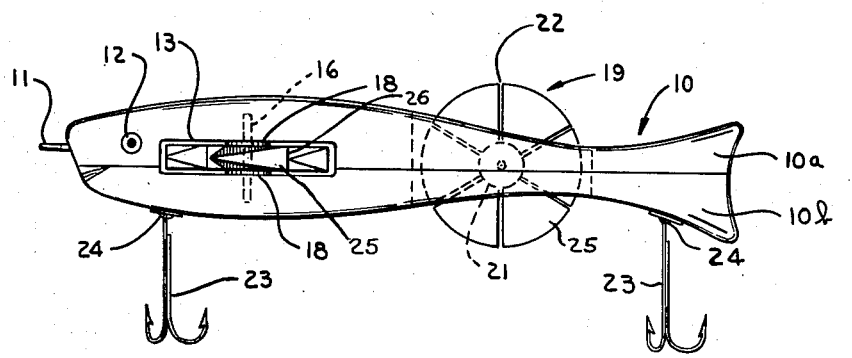
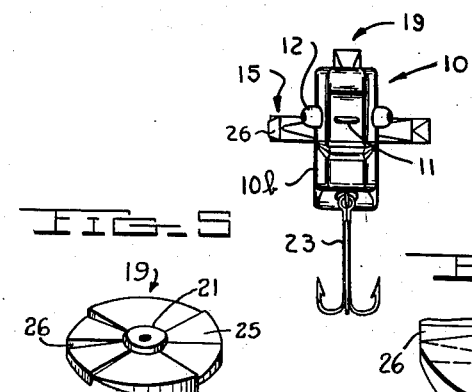
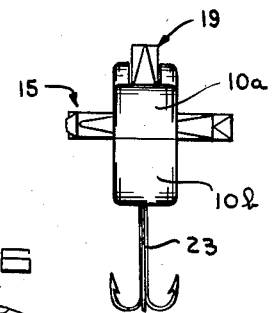
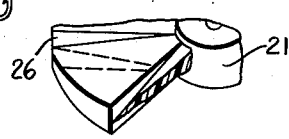
INVENTOR.
WAYNE B. MOULTON
BY
*Arthur M. Smith*
ATTORNEY Patented Nov. 13, 1951

2,574,702

UNITED STATES PATENT OFFICE 2,574,702

FISH LURE

Wayne B. Moulton, Detroit, Mich.

Application March 16, 1949, Serial No. 81,819

5 Claims. (Cl. 43—42.12)

1

The present invention relates to an artificial fish lure and more particularly to such a fish lure which comprises a body member having rotatable turbine wheels rotatably mounted therein.

Fish lures are known which have spinners disposed on axles extending forwardly and rearwardly from the body of the lure. Lures have also been designed with rotatable wheel members disposed on axles extending laterally from the body of the lure. Both types of lure have the axles supported on one end only. It has been found that such axles bend when encountering underwater or surface obstructions due to this inadequate support of the axles and thus interfere with the proper functioning of the rotatable wheel members. The axles, extending outwardly from the body of the lure also entangle in the weeds and the like.

Therefore, it is a principal object of the present invention to provide a fish lure which includes turbine wheels mounted for rotation on axles which are disposed within the body of said lure.

It is a further object of the present invention to provide a fish lure having turbine wheels, in which each wheel includes several radial blades having faces disposed to the plane of travel of the lure in such a manner that such wheels are sensitive to slight forces and thus rotate readily as the lure travels through the water.

It is another object of the present invention to provide a fish lure having turbine wheels which may be disposed either vertically and laterally or both, relative to the body so that the water disturbances and vibrations caused by rotation of said wheels will travel in all directions.

Other objects of this invention will appear in the following description and appended claims, reference being had to the accompanying drawings forming a part of this specification wherein like reference characters designate corresponding parts in the several views.

In the drawings:

Fig. 1 is a plan view of a fish lure embodying the present invention.

Fig. 2 is a side elevation of the fish lure shown in Fig. 1.

Fig. 3 is a front elevation of the fish lure shown in Fig. 1.

Fig. 4 is a rear elevation of the fish lure shown in Fig. 1.

Fig. 5 is a perspective view of the turbine wheel 19 embodied in the fish lure shown in Fig. 1.

2

Fig. 6 is a fragmentary perspective view of the turbine wheel shown in Fig. 5.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The fish lure of the present invention comprises a body member 10 which is shown in the configuration of a minnow for purposes of illustration. Other figures shaped to resemble various fish foods such as small frogs, crawfish, or the like may also be used. At the forward end of the lure, an eyehook 11 is disposed to permit attachment of the lure to a fish line or leader. Slightly protruding eyes are denoted by the figure 12. These eyes are preferably formed of bright glass or plastic so as to reflect light and add to the effectiveness of the lure. The eyes may be of the conventional pierced bead type which are affixed by small pins or screws or may be moulded as an integral part of the body member 10. A lateral slot 13 is formed near the front end of the body 10 of the lure, and a vertical slot 14 is formed near the rear of the body of the lure. The slots may be reversed without departing from the spirit of my invention or both may be located vertically or horizontally. Also, one or several such slots may be used. A turbine wheel 15 is disposed in the forward slot 13 and is provided with a hub 18 which is centrally pierced by an axle 16 which is journaled in the body 10 of the lure. If desired, small beads or guides may be disposed on each side of the turbine wheel 15 in place of or in addition to the hub 18 and along the axle 16 to prevent the said wheel 15 from binding against the walls of the slot 13. This same arrangement is used for the rear turbine wheel 19, the axle being denoted by the numeral 20 and journaled in the body 10 and the hub by the numeral 21. One turbine wheel is mounted in each slot provided in the body member. The axles 16 and 20 can be either entirely within the body 10 as shown, or may be arranged to extend through the body to permit retraction of the axles to permit changing the turbine wheels as desired to permit the fisherman to change and use assorted colors of turbine wheels with each individual bait.

The turbine wheels 15 and 19 are preferably formed of plastic or lightweight metal. Figs. 5 and 6 are perspective views of the wheel 19. The following remarks in connection with the wheel 19 also pertain to the wheel 15 which is identical in construction.

The wheel 19 is preferably formed as a disc having a laterally extending hub 21 and a plurality of radially disposed blades 25 separated by radial slots 22 (Fig. 2). Each blade 25 is triangular in transverse cross section, and the base 26 thereof is rectangular and is disposed at an angle to the plane of travel of the lure, thus forming a face portion against which the force of the water is exerted to effect rotation of the turbine wheel when the lure is moved therethrough. This construction avoids thin delicate blades and provides a wheel which is not readily damaged when the lure is struck by a fish or when the lure is retrieved through weeds. In addition, the back of each blade 25 tapers away from the base or face 26 and provides a streamlined back portion which offers very little resistance to the water when it is rotated through the water in the plane of travel of the lure, thus facilitating rotation of the wheel as the water contacts the face 26.

Hooks 23, here shown as the conventional treble type, are secured to the body 10 of the lure in any conventional manner such as by the screw threaded eyelet 24 shown in the drawings.

As here shown, a lure of the present invention is preferably formed with the body 10 as two sections 10a and 10b secured together in any desired manner, along a longitudinal parting line. By this construction, the sections 10a and 10b may be separately formed, as by moulding in plastic or shaping in wood or other materials. The sections 10a and 10b may be in the form of hollow sections which may provide water tight air cavities, if buoyancy and light weight of the lure is desired or which may be solid if a less buoyant or "sinking" type of lure is desired. If formed of plastic materials, the portions 10a and 10b may be of different colors to simulate respectively, the darker top colors and lighter bottom colors of natural bait, such for example as minnows and smaller fish.

This construction of the body 10 permits the formation in the body of journals for the ends of the turbine axles so that the turbine wheels 18 and 19 mounted on their respective axles may be fitted in place in the slots 13 and 14 before the two sections 10a and 10b are secured together along their adjacent longitudinal faces. Thus, assembly of the lure is greatly facilitated and a substantial latitude of design is permitted.

By providing a sufficient number of blades (eight has been found to be a satisfactory number), and by providing the proper pitch angle to the base portion of each blade, an extremely sensitive turbine wheel is formed. Thus, if the fisherman is plug casting in the heat of the summer when the lure is generally fished deep near the bottom in the cooler water and retrieved slowly, a slow retrieve will rotate the sensitive turbine wheels sufficiently to send out vibrations and attract fish. This is a definite advantage since a slow retrieving or trolling speed is preferred by a vast number of fishermen and is recommended by many of the fishing experts, particularly for bass.

I have thus provided a fish lure embodying turbine wheels wherein the axles for such wheels are journaled at both ends within the body portion, thus effecting a rigid support of the axles. Further, since the axles are disposed within the body of the lure they do not entangle with weeds and other obstructions as is the case with conventional constructions wherein the wheel or spinner axles extend outside the body of the lure.

The present invention also affords a turbine wheel construction which is sensitive to slight forces and which will rotate readily with a slow retrieve. The effect of the forward turbine 15 is to drive the body 10 in a sidewise direction relative to the direction of the retrieving forces. The rear turbine 19 drives the body 10 in a vertical direction relative to the direction of the retrieving forces. The result of the combined action of the retrieving force, the forward turbine 15 and the rear turbine 19 is that the lure moves in simulation of the action of a wounded or crippled minnow or the like and this motion, together with the disturbance of the water by the turbine wheels provides an attractive bait having an unusual motion when retrieved.

Having thus described my invention, I claim:

1. A fishing lure comprising a body having a head and a tail portion and formed of an upper section and a lower section joined longitudinally along adjacent faces, said body including a transverse slot adjacent the head portion thereof and a vertical slot adjacent the tail portion thereof, a rotatable wheel mounted in each of said slots for rotation therein, each of said wheels comprising a circular disc divided into a plurality of radial segments each of which is triangular in transverse cross section the base of each of said segments forming a face portion against which the pressure of the water is exerted to effect rotation of the said wheels when the lure is moved through the water, a line attaching eye secured in the head portion forward of said transverse slot and a plurality of depending hooks secured to the lower section of said body portion.

2. A fishing lure as claimed in claim 1 and further characterized in that the rotatable wheel in the said transverse slot rotates about a vertical axis and in that the rotatable wheel in said vertical slot rotates about a horizontal axis.

3. An artificial lure including a body having a transverse slot and a vertical slot therein, a turbine wheel rotatably mounted in said transverse slot for rotation about a vertical axis, a turbine wheel rotatably mounted in said vertical slot for rotation about a horizontal axis, each of said turbine wheels comprising a plurality of radial segments and each segment being triangular in transverse cross section, the base of each segment providing a face portion against which the pressure of the water is exerted to effect rotation of the said turbine when the lure is moved through the water, and means to attach said body to a fishing line, and hooks suspended from said body.

4. An artificial fish lure comprising a body having a pair of slots extending therethrough perpendicular to each other, a pair of turbine wheels mounted one in each of said slots on an axle which is rotatably journaled within said body, said turbine wheels being adapted to rotate in perpendicular planes, thus sending vibrations in substantially all directions when the lure is moved through the water.

5. An artificial fish lure including a body having a slot extending therethrough and a turbine wheel rotatably disposed through said slot, said turbine wheel comprising a plurality of radial segments each segment being triangular in transverse cross section the base of each segment providing a face portion against which the pressure of the water is exerted to effect rotation of the said turbine when the lure is moved through the water.

WAYNE B. MOULTON.

REFERENCES CITED

The following references are of record in the file of this patent:

UNITED STATES PATENTS

| Number | Name | Date |
|---|---|---|
| 810,017 | Ackerman | Jan. 16, 1906 |
| 2,328,072 | Hans | Aug. 31, 1943 |
| 2,333,425 | Jackson, Sr. | Nov. 2, 1943 |
| 2,341,234 | O'Byrne | Feb. 8, 1944 |
| 2,450,253 | Parnell, Sr. | Sept. 28, 1948 |
| 2,490,248 | Barthel | Dec. 6, 1949 |